United States Patent
McGill, Jr.

(10) Patent No.: US 9,216,795 B2
(45) Date of Patent: Dec. 22, 2015

(54) HULL DESIGN WITH ENGINE AIR FLOW SYSTEM

(75) Inventor: William H. McGill, Jr., Clearwater, FL (US)

(73) Assignee: MARINEMAX, INC., Clearwater, FL (US)

( * ) Notice: Subject to any disclaimer, the term of this patent is extended or adjusted under 35 U.S.C. 154(b) by 310 days.

(21) Appl. No.: 13/385,085

(22) Filed: Feb. 1, 2012

(65) Prior Publication Data

US 2012/0325136 A1 Dec. 27, 2012

Related U.S. Application Data

(60) Provisional application No. 61/571,275, filed on Jun. 24, 2011.

(51) Int. Cl.
| | |
|---|---|
| *B63H 21/00* | (2006.01) |
| *B63B 1/08* | (2006.01) |
| *B63H 20/24* | (2006.01) |

(52) U.S. Cl.
CPC . *B63B 1/08* (2013.01); *B63H 20/24* (2013.01); *Y02T 70/128* (2013.01)

(58) Field of Classification Search
CPC ...... B63H 20/00; B63H 20/001; B63H 21/32; B63H 21/36; B63B 1/042
USPC .......... 114/271, 288, 290; 440/1, 88 A, 88 C, 440/89 R
See application file for complete search history.

(56) References Cited

U.S. PATENT DOCUMENTS

| | | | |
|---|---|---|---|
| 3,371,362 A * | 3/1968 | Butler | 114/355 |
| 3,452,704 A † | 7/1969 | Watkins | |
| 3,702,485 A * | 11/1972 | Thompson | 114/355 |
| 4,997,398 A † | 3/1991 | Glen | |
| 5,129,847 A † | 7/1992 | Mondek | |
| 5,176,551 A † | 1/1993 | Blanchard et al. | |
| 5,409,409 A † | 4/1995 | Blanchard et al. | |
| 5,505,644 A † | 4/1996 | Ousley, II et al. | |
| 5,562,511 A † | 10/1996 | Blanchard et al. | |
| 2009/0224132 A1† | 9/2009 | Mochizuki | |
| 2012/0028517 A1† | 2/2012 | Mochizuki et al. | |

FOREIGN PATENT DOCUMENTS

WO      2010/116576 A1 † 10/2010
WO      WO 2010/116576 A1 † 10/2010

OTHER PUBLICATIONS

Skorupa, Joe, "The Inside Outboard", Popular Mechanics, May 1991, 3 pages.†

\* cited by examiner
† cited by third party

*Primary Examiner* — Daniel V Venne
(74) *Attorney, Agent, or Firm* — Arthur W. Fisher

(57) ABSTRACT

A hull design configured for use in combination with at least one outboard motor disposed within a motor compartment formed at the stern of the boat to operatively enclose the outboard motor having an air flow system to direct the flow of air to the engine of the outboard motor during operation thereof and an idle exhaust system to direct the flow of exhaust gases from the motor compartment when the engine of the outboard is at idle while permitting the outboard motor to be trimmed or tilted and rotated for directional control of the boat and a directional fluid flow control to channel or direct water flow to the propeller of the outboard motor during operation thereof.

17 Claims, 8 Drawing Sheets

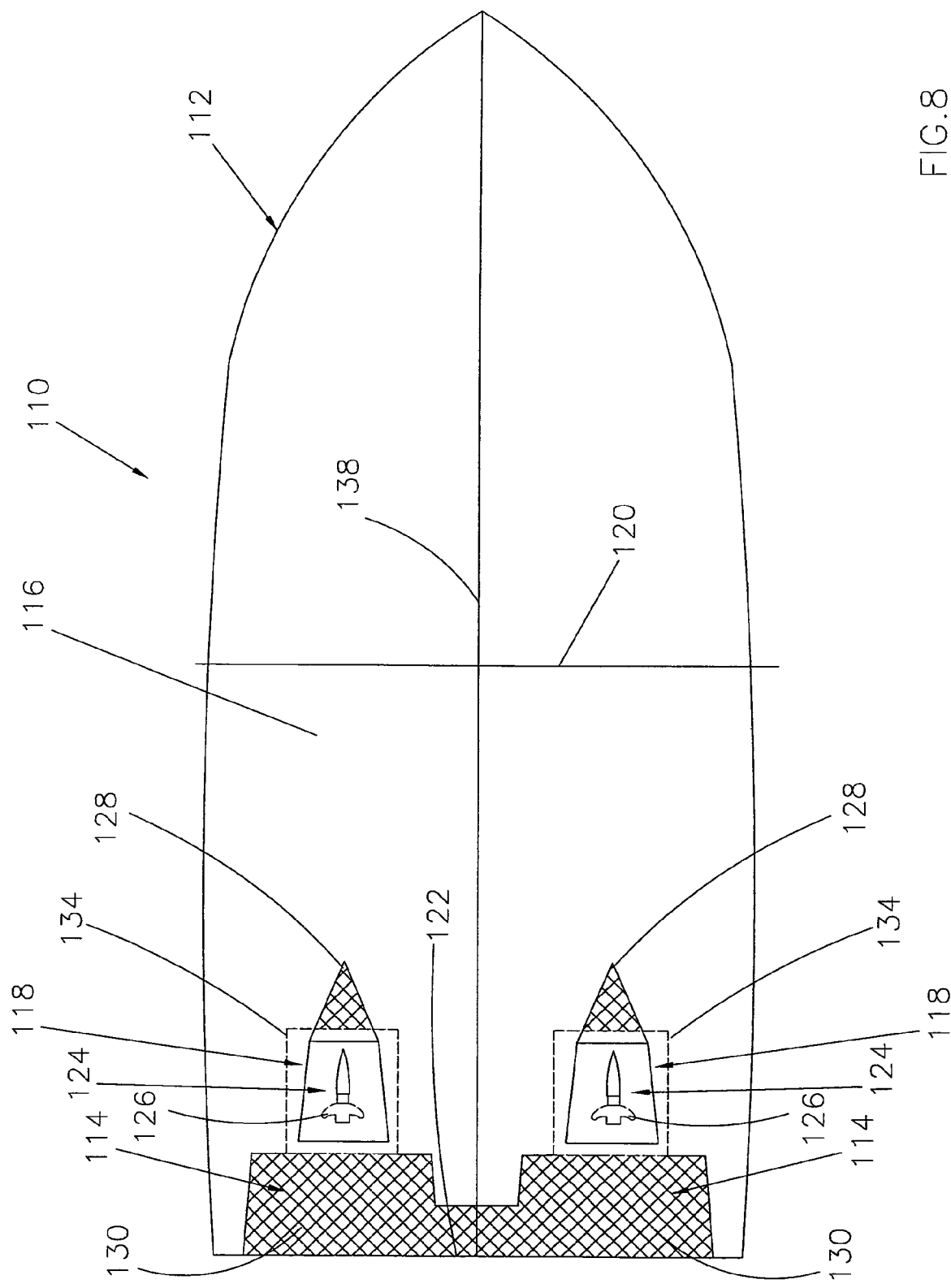

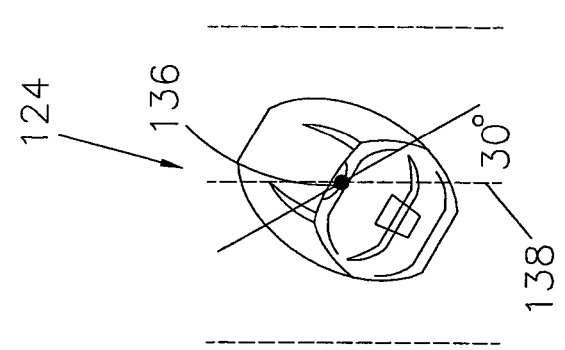
FIG. 11
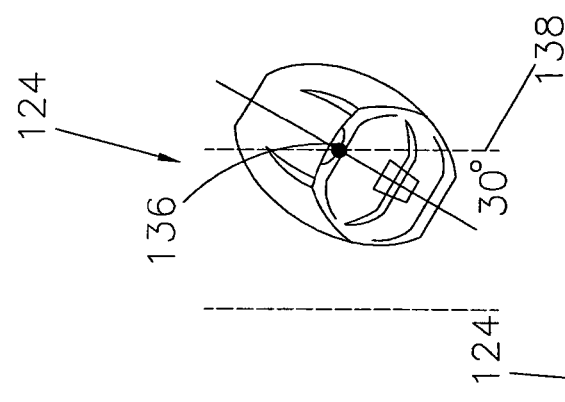
FIG. 10
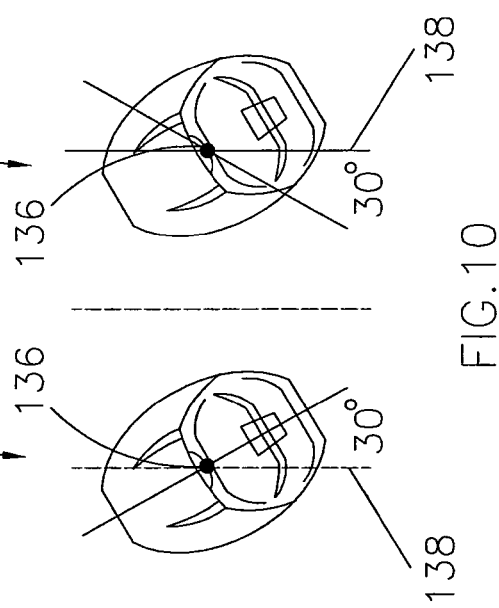
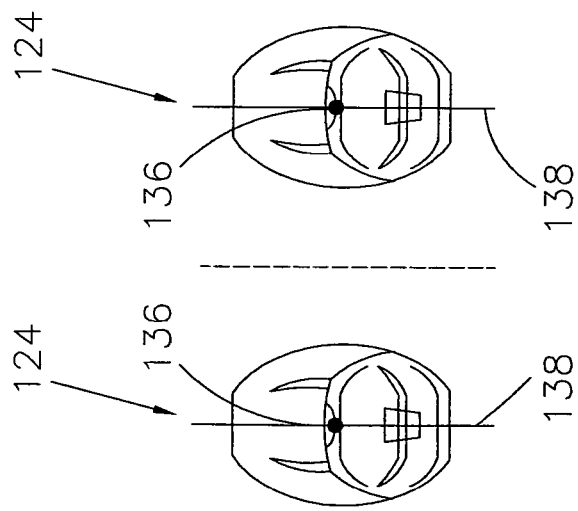
FIG. 9

HULL DESIGN WITH ENGINE AIR FLOW SYSTEM

CROSS-REFERENCE

This application claims priority of provisional application Ser. No. 61/571,275 filed Jun. 24, 2011.

BACKGROUND OF THE INVENTION

1. Field of the Invention

A hull design and engine air flow system configured to operatively mount one or more outboard motors inboard or forward of the rear most portion of a boat including a motor compartment to enclose each of the outboard motors.

2. Description of the Prior Art

There are several types of boat/motor combinations including an outboard motor mounted on the transom or stern of a boat, a stern drive inboard motor configuration and a V-type inboard motor configuration. Each of these combinations has draw-backs or disadvantages, In particular, an outboard motor presents a significant safety hazard due to the position of the propeller aft of the stern or transom.

On the other hand, a stern drive configuration has a larger bilge area and a significant water leak area. In addition, maintenance is expensive and often difficult. Since the propeller remains in the water, barnacles and saltwater algae accumulate.

Finally, in an inboard engine configuration the placement of the motor and drive take up a significant amount of space reducing usable cabin area. Moreover, the position of the motor in the hull results in internal exhaust and multiple hull penetrations creates an environment susceptible to water intrusion into the engine compartment. Lastly, this configuration is expensive to maintain and permits accumulation of barnacles and algae on the rudder, shaft, and propeller.

The following are several examples of the prior art.

U.S. Pat. No. 5,833,502 shows a boat hull comprising a deep-V forward section and a rear tunnel section extending rearward from the midpoint of the boat. A vertically adjustable outboard motor is disposed in forward portion of the rear tunnel section to accommodate different water depths and operational requirements. The outboard motor is disposed within a console above the midpoint for convenient maintenance access.

U.S. Pat. No. 4,913,079 discloses a mounting arrangement disposed mid-ship for an outboard motor comprising a cylindrical frame extending upward through the bottom of a yacht or boat to allow for vertical adjustment of the outboard motor.

U.S. Pat. No. 3,548,428 describes a boat having hydraulic rams mounted on the hull bottom and connected to a wall supported transom to raise and lower an outboard motor within the well of the hull.

JP 2-109,767 and FR 2,467,774 both relate to an outboard motor vertically movable within a well formed in the hull.

While some of the prior art may contain some similarities relating to the present invention, none of them teach, suggest or include all of the advantages and unique features of the invention disclosed hereunder.

SUMMARY OF THE INVENTION

The present invention relates to a hull design including a directional fluid flow control configured for use in combination with at least one outboard motor disposed within a motor compartment including an air flow system formed at the stern of the boat to operatively enclose the outboard motor.

The air flow system directs the flow of air to the engine of the outboard motor during operation thereof and an idle exhaust system to direct the flow of exhaust gases from the motor compartment when the engine of the outboard is at idle while permitting the outboard motor to be trimmed or tilted and rotated for directional control of the boat.

The directional fluid flow control comprises at least one pair of substantially parallel ribs extending downward from the bottom of the hull to direct the water into the propeller of the outboard motor.

Alternatively, the directional fluid flow control may comprise a tunnel that expands in the horizontal plane from midship to the stern to channel the flow of water into the propeller of the outboard motor as the boat moves through the water.

BRIEF DESCRIPTION OF THE DRAWINGS

For a fuller understanding of the nature and object of the invention, reference should be had to the following detailed description taken in connection with the accompanying drawings in which:

FIG. 8 is a bottom view of the hull design of the alternate embodiment of the present invention with the pair of outboard motors aligned with the centerline of the boat.

FIG. 9 is a top view of a pair of outboard motors aligned with the centerline of the boat.

FIG. 10 is a top view of pair of outboard motors rotated to steer to starboard.

FIG. 11 is a top view of pair of outboard motors rotated to steer to port.

Similar reference characters refer to similar parts throughout the several views of the drawings.

DETAILED DESCRIPTION OF THE PREFERRED EMBODIMENT

The present invention relates to a hull design configured for use in combination with a pair of outboard motors each operatively disposed within a motor compartment.

Figure 1:
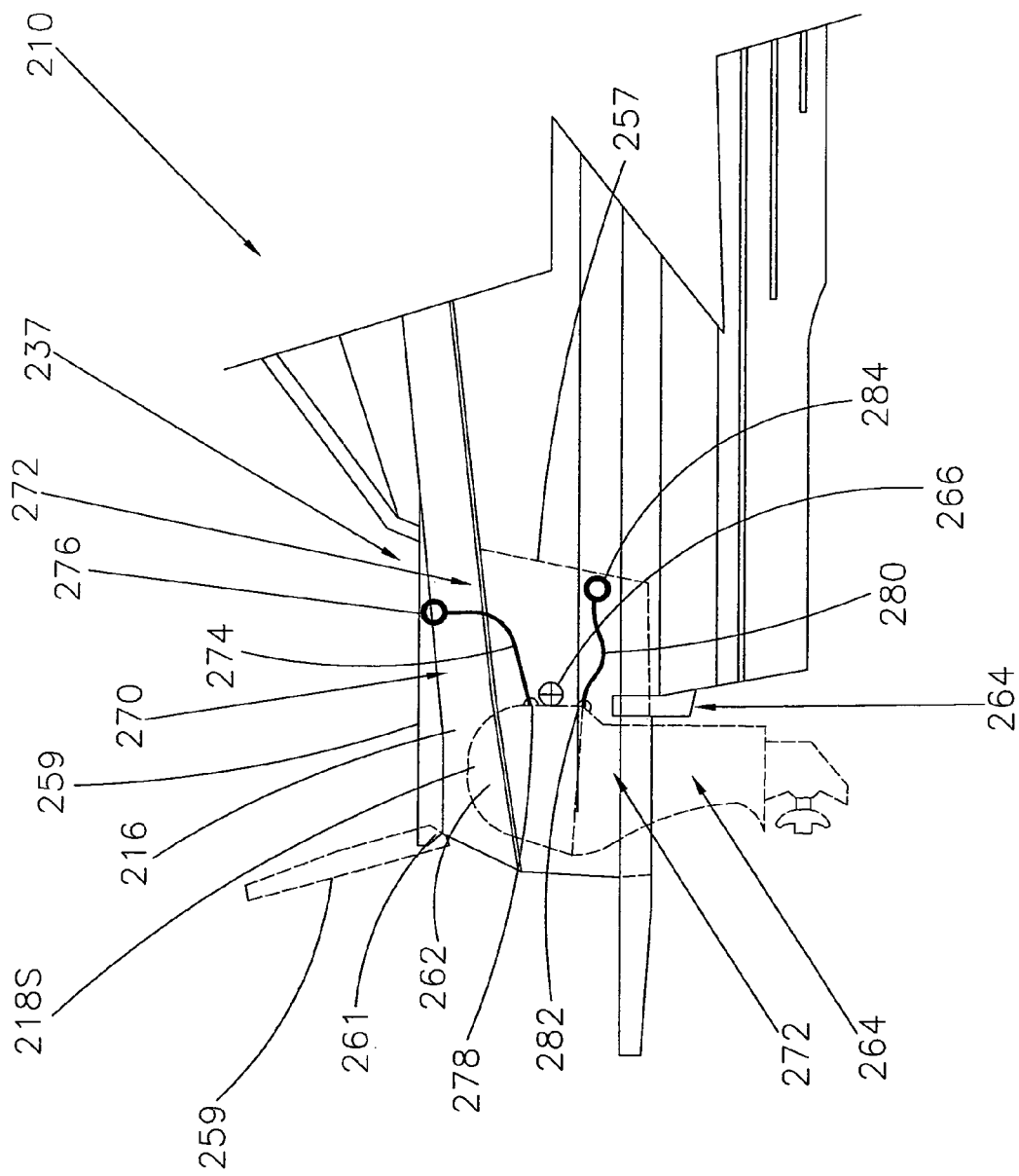
FIG. 1 is a partial side view of the hull design of the present invention.
Figure 2:
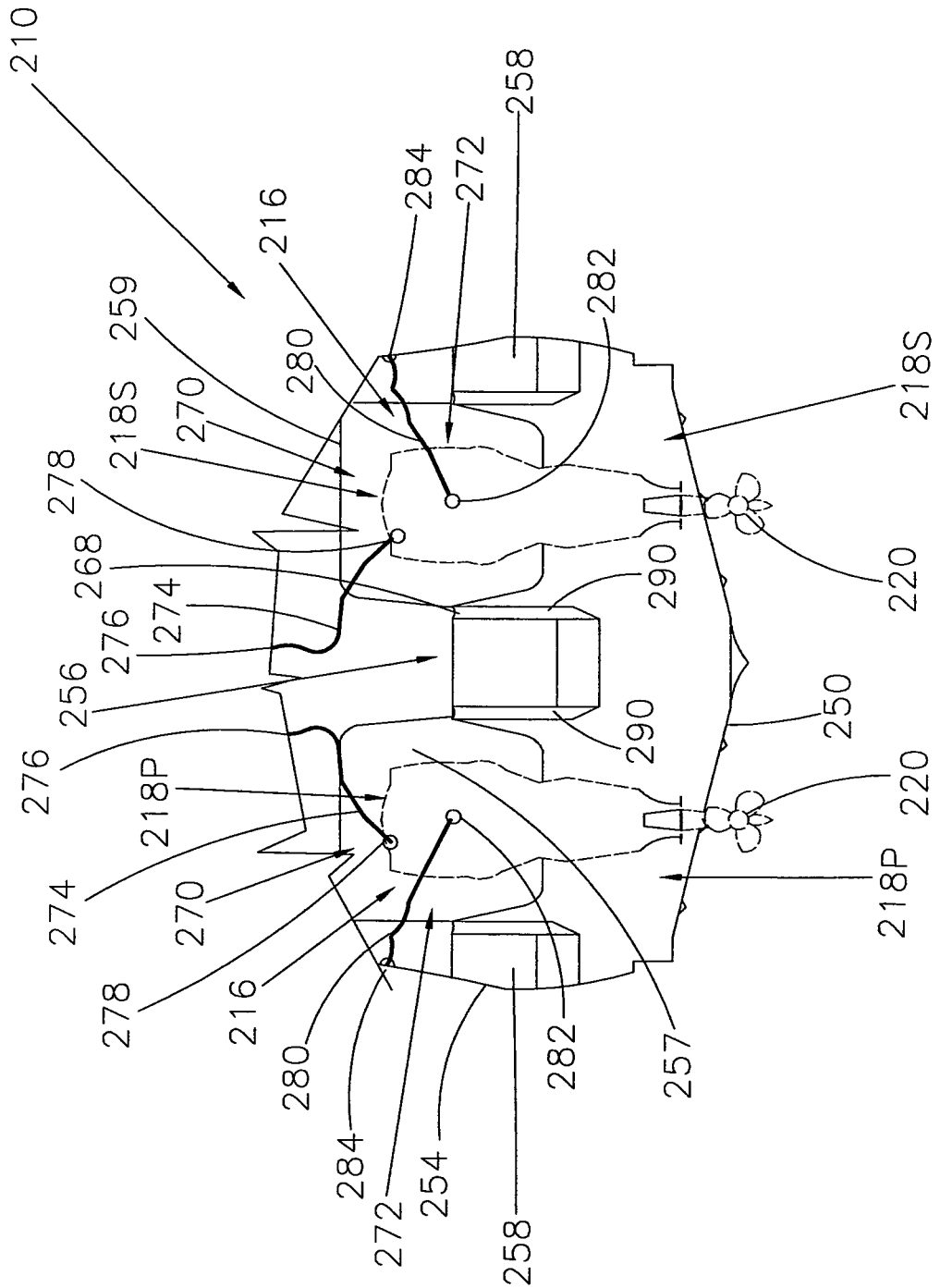
FIG. 2 is a rear view of the hull design of the present invention taken from the stern.
Figure 3:
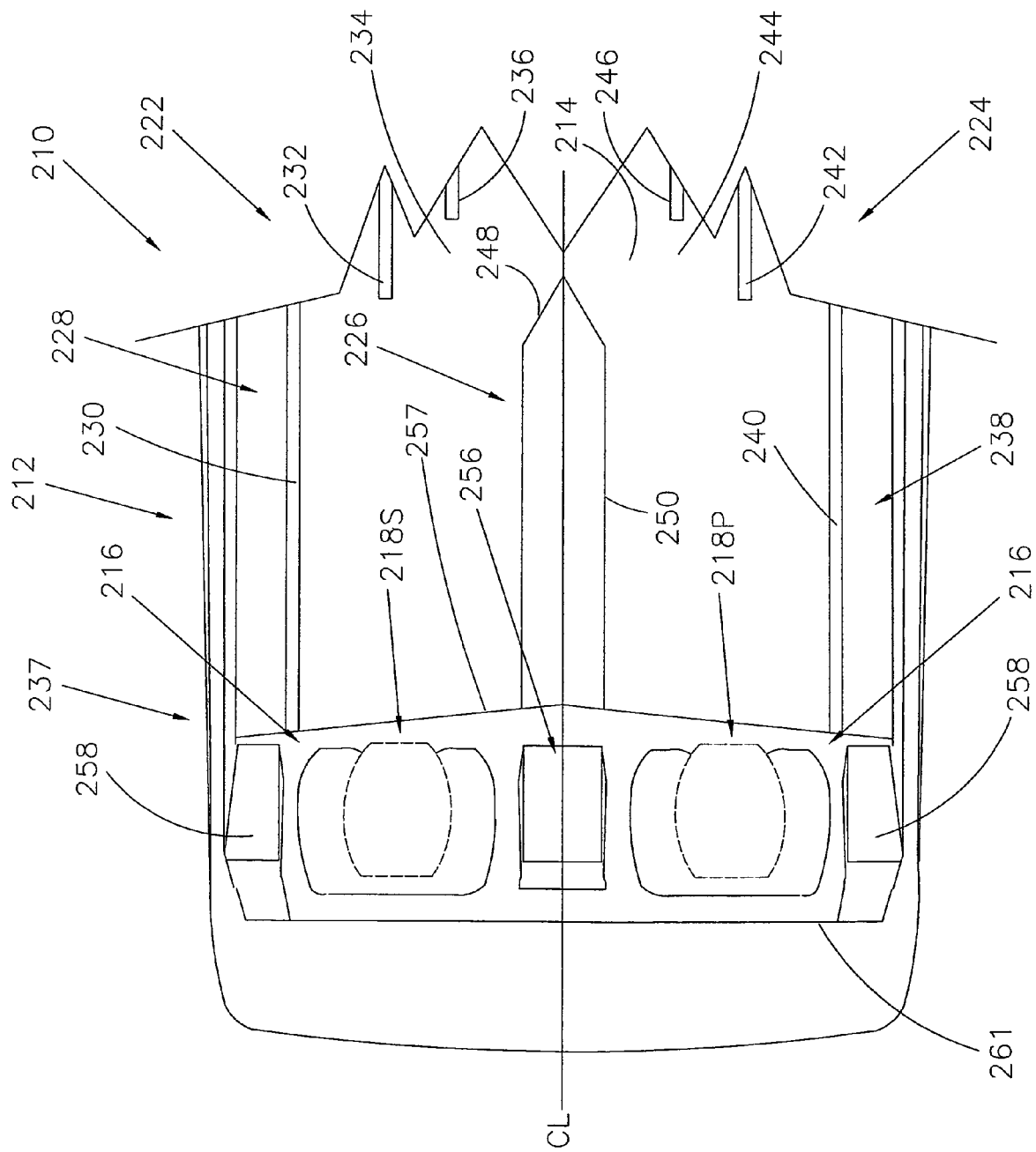
FIG. 3 is a partial bottom view of the hull design of the present invention with the pair of outboard motors aligned with the centerline of the boat.

Specifically, as shown in FIGS. 1 through 3 depict a boat generally indicated as 210 including a hull generally indicated as 212 having a directional fluid flow control as described hereinafter formed in the bottom 214 of the hull 212 to direct water flow to each of the outboard motors each indicated as 218 and a corresponding propeller 220 disposed within a corresponding motor compartment including an air flow system as described hereinafter to supply air to the outboard motors 218 and vent exhaust gases when at idle each generally indicated as 216 at the aft portion of the hull 212 of the boat 210.

As best shown in FIG. 3, the directional fluid flow control comprises a first lateral or starboard flow region, a second lateral or port flow region and a midship flow region generally indicated 222, 224, and 226 respectively.

The first lateral or starboard flow region 222 comprises a first or outer starboard flow channel 228 cooperatively formed by a substantially longitudinally disposed first or outer starboard directional control member or rib 230 extending downward from the bottom 214 of the hull 212 and a substantially longitudinally disposed intermediate or center starboard directional control member or rib 232 extending downward from the bottom 214 of the hull 212 and a second or inner starboard flow channel 234 cooperatively formed by a substantially longitudinally disposed second or inner starboard directional control member or rib 236 extending downward from the bottom 214 of the hull 212 and the substantially longitudinally disposed intermediate or center starboard directional control member or rib 232 extending downward from the bottom 214 of the hull 212.

As best shown in FIG. 3, the centerlines of the substantially longitudinally disposed first or outer starboard directional control member or rib 230 and the substantially longitudinally disposed second or inner starboard directional control member or rib 236 are aligned on opposite sides of the starboard outboard motor 218S; while, the substantially longitudinally disposed intermediate or center starboard directional control member or rib 232 is substantially aligned with the center of starboard outboard motor 218S and the corresponding propeller 220.

Additional, the substantially longitudinally disposed first or outer starboard directional control member or rib 230 is adjacent to or extends substantially to the stern generally indicated as 237; while, the substantially longitudinally disposed intermediate or starboard directional control member or rib 232 and the substantially longitudinally disposed second or inner starboard directional control member or rib 236 decrease in length from the stern 237 to the bow (not shown) relative to each other and relative to the substantially longitudinally disposed first or outer starboard directional control member or rib 230.

The second lateral or port flow region 224 comprises a first or outer port flow channel 238 cooperatively formed by a substantially longitudinally disposed first or outer port directional control member or rib 240 extending downward from the bottom 214 of the hull 212 and a substantially longitudinally disposed port intermediate or center directional control member or rib 242 extending downward from the bottom 214 of the hull 212 and a second or inner port flow channel 244 cooperatively formed by a substantially longitudinally disposed second or inner port directional control member or rib 246 extending downward from the bottom 214 of the hull 212 and the substantially longitudinally disposed port intermediate or center port directional control member or rib 242 extending downward from the bottom 214 of the hull 212.

As best shown in FIG. 3, the centerlines of the substantially longitudinally disposed first or outer port directional control member or rib 240 and the substantially longitudinally disposed second or inner port directional control member or rib 246 are aligned on opposite sides of the port outboard motor 218P; while, the substantially longitudinally disposed intermediate or center port directional control member or rib 242 is substantially aligned with the center of port outboard motor 218P and the corresponding propeller 220.

Additional, the substantially longitudinally disposed first or outer port directional control member or rib 240 is adjacent to or extends substantially to the stern 237; while, the substantially longitudinally disposed intermediate port directional control member or rib 242 and the substantially longitudinally disposed second or inner port directional control member or rib 246 decrease in length from the stern 237 to the bow (not shown) relative to each other and relative to the substantially longitudinally disposed first or outer port directional control member or rib 240.

The midship flow region 226 comprises a first or forward transition portion comprising a diagonally disposed substantially flat flow control surface 248 extending upwardly from the bottom 214 of the hull 212 and a substantially horizontally disposed substantially flat flow control surface 250 formed in the rear portion the bottom 214 of the hull 212 along the centerline CL extending from the diagonally disposed substantially flat flow control surface 248 to the stern 237.

As best shown in FIG. 3, the origin of the flow control surface 248 of the midship flow region 226 is substantially aligned laterally relative to the terminus of the intermediate or center starboard directional control member or rib 232 of the first lateral or starboard flow region 222 and the intermediate or center port directional control member or rib 242 of the second lateral or port flow region 224.

As best shown in FIG. 2, the bottom of the hull 212 comprises a truncated V-shape as the rear portion thereof from the stern 237 forward to or adjacent the terminus of the diagonally disposed substantially flat flow control surface 248 of the midship flow region 226 cooperatively formed by the substantially horizontally disposed substantially flat flow surface 250 and the bottom hull sections 252 extending to corresponding sides 254 of the hull 212.

As shown in FIGS. 1 through 3, each motor compartment 216 is cooperatively formed between a center midship console generally indicated as 256, a substantially vertical rear bulkhead 257, a corresponding hull side extension 258 projecting rearwardly from each side of the stern 237 and a hatch 259 hingedly or pivotally attached to an aft cross-member 261 extending between the hull side extensions 258 to virtually enclose the motor housing 262. The hatch 259 allows access to the upper portion of each outboard motor 218S and 218P and corresponding motor housing 262.

The upper portion of each motor compartment 216 may be enlarged to allow the outboard motors 218S and 218P to rotate about a substantially vertical axis 136 as shown in FIGS. 10 through 12.

As best shown in FIG. 1, each outboard motor 218S and 218P is mounted within the corresponding motor compartment 216 by a motor positioning assembly generally indicated as 264 comprising a pivot trim subassembly coupled to the stern 237 to independently pivot each outboard motors 218S and 218P vertically on a corresponding substantially horizontal pivot 266 between a substantially vertical position, and an inclined or tilted position and a rotational subassembly to rotate the outboard motors 218S and 218P on a corresponding substantially vertical rotation axis to steer the boat 10.

The pivot trim subassembly and the rotational subassembly may comprise existing state of the art devices incorporating drive motors, cylinders or screws and cables.

As best shown in FIG. 2, the center midship console 256 comprises a hollow housing 268 to provide buoyancy and lift to the boat 210 at rest and when planning and an access hatch 290 on each side thereof movable between an open and closed position to provide access to each propeller 220 for maintenance while the boat 210 is still in the water.

Since each outboard motor 218S and 218P is virtually enclosed within the corresponding motor compartment 216, the invention further includes an air flow system to direct the flow of air to each motor compartment 216 during operation of the corresponding outboard motor 218S or outboard motor 218P and an idle exhaust system to direct the flow of exhaust gases from each motor compartment 216 when the corresponding outboard motor 218S or outboard motor 218P is at idle. The air flow system comprises an air intake portion generally indicated as 270 in each motor compartment 216 to feed fresh air from the environs to the air intake of each outboard motor 218S and 218P. The idle exhaust system comprises an exhaust gas portion generally indicated as 272 in each motor compartment 216 to discharge exhaust gases from the exhaust of each outboard motor 218S and 218P into the environs when the corresponding outboard motor 218S or 218P is idling or at idle.

Each air intake portion 270 comprises a flexible air intake hose or conduit 274 coupled between an air inlet housing or air scoop 276 attached to the rear bulkhead 257 or the side 54 of the hull 252 or the boat 210 and an air supply intake 278 attached to the outboard motors 218S and 218P to feed air from the environs into the air intake housing or scoop 276 through the flexible air intake hose or conduit 274 and the air supply intake 278 into the corresponding outboard motor 218S and 218P through the corresponding air intake (not shown).

Each idle exhaust system 272 comprises a flexible gas outlet hose or conduit 280 coupled between an exhaust gas outlet housing or coupler 282 attached to the front portion of the corresponding outboard motors 218S and 218P over the corresponding exhaust gas outlet (not shown) and a corresponding exhaust gas discharge port 284 formed in the hull 212 or the boat 210 to discharge exhaust gases from the exhaust gas outlet (not shown) through the exhaust gas outlet housing or coupler 282, the flexible gas outlet hose or conduit 280 and exhaust gas discharge port 284 into the environs.

The vertical lift subassembly, the pivot trim subassembly and the rotational subassembly may comprise existing state of the art devices incorporating drive motors, cylinders or screws and cables.

Figure 4:
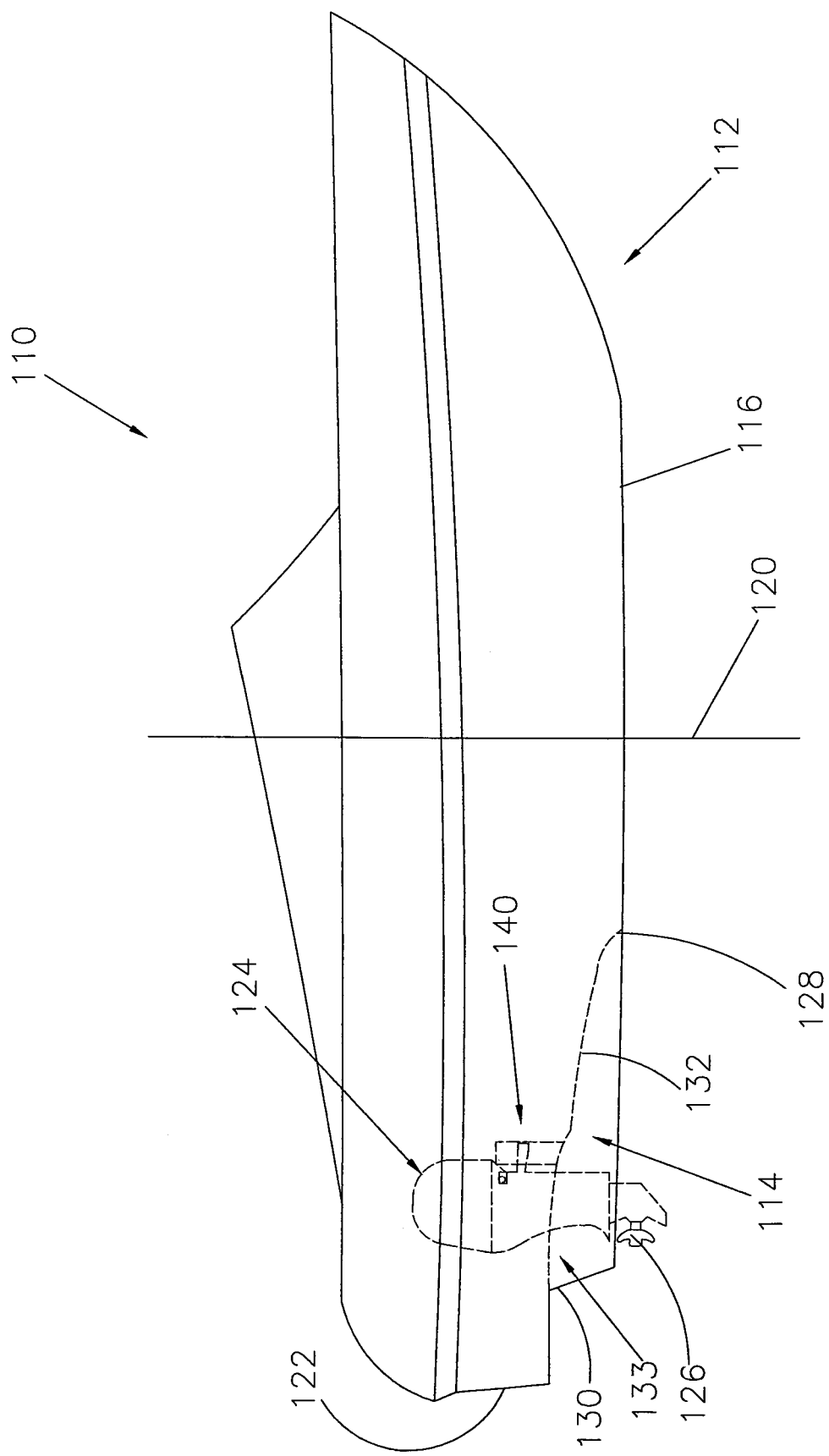
FIG. 4 is a side view of the hull design of an alternate embodiment of the present invention.
Figure 5:
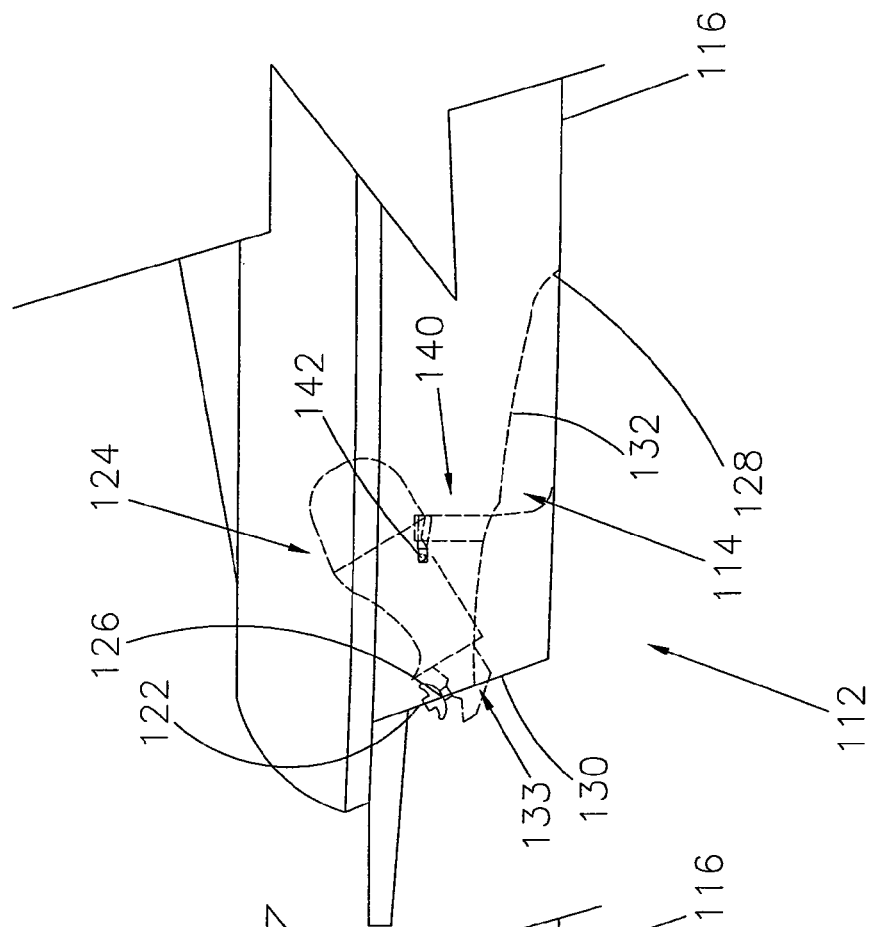
FIG. 5 is a side view of the hull design of the alternate embodiment of the present invention with the outboard motors in the trimmed position.
Figure 6:
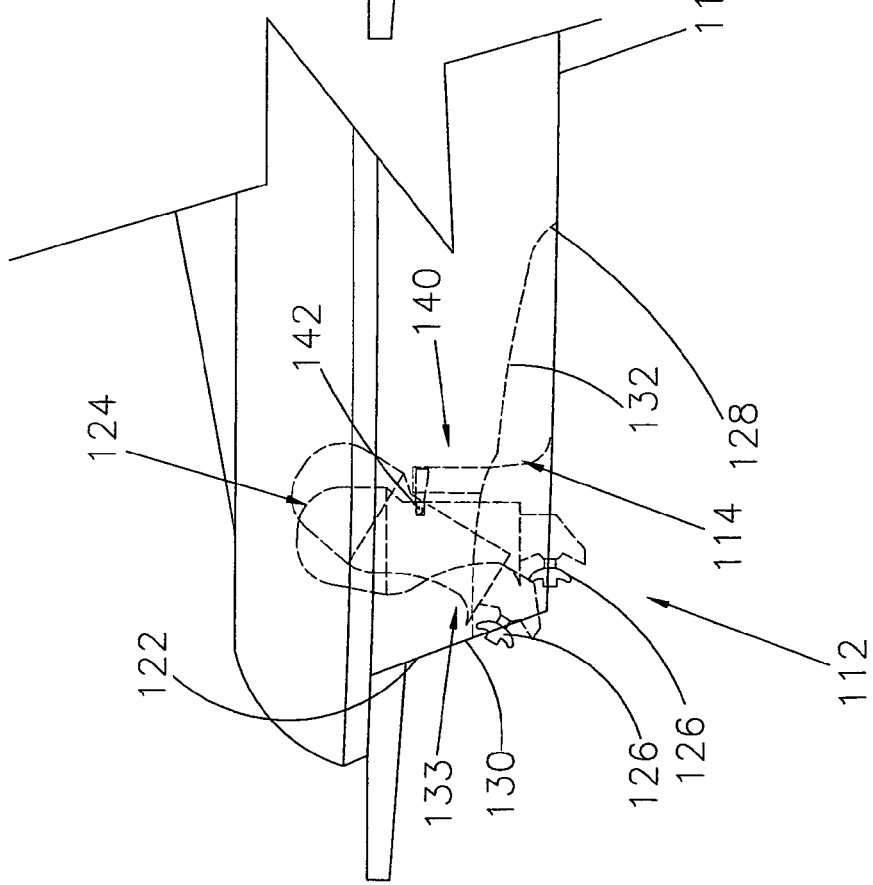
FIG. 6 is a side view of the hull design of the alternate embodiment of the present invention with the outboard motors in the tilted position.
Figure 7:
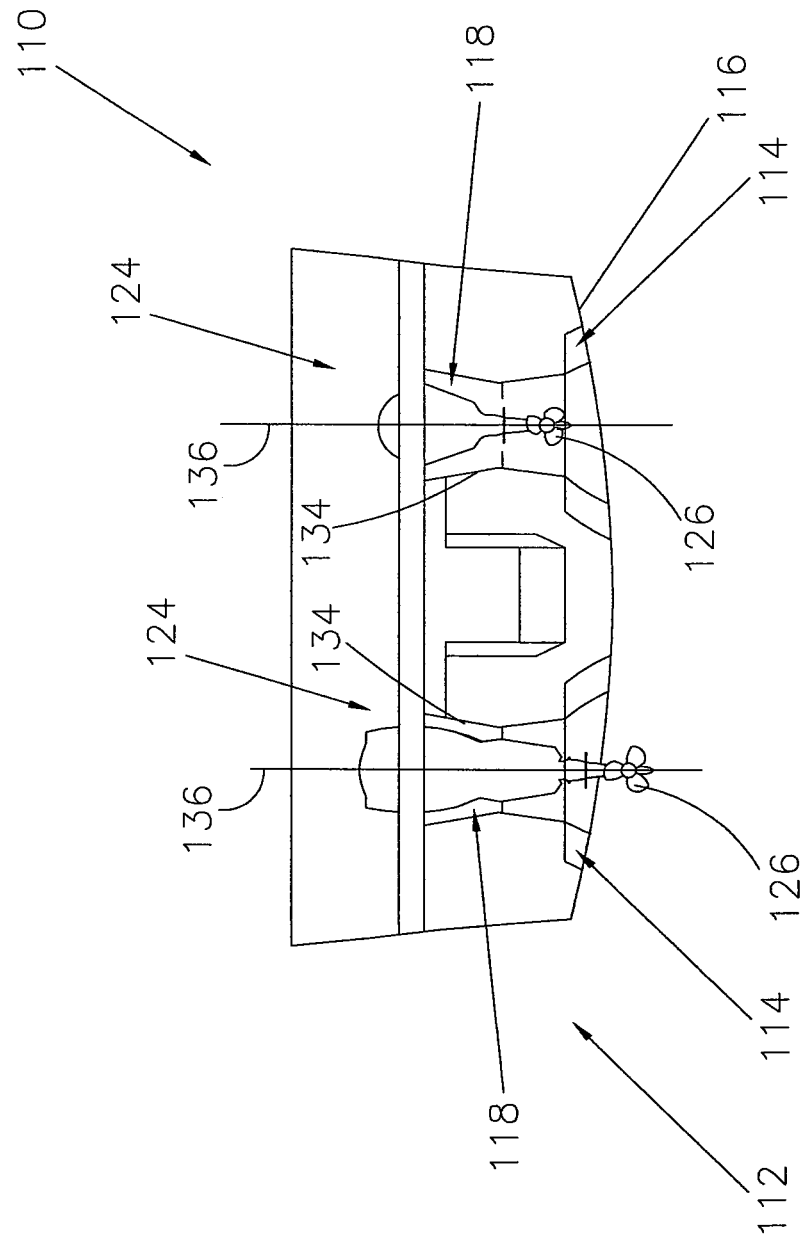
FIG. 7 is a rear view of the hull design of the alternate embodiment of the present invention taken from the stern illustrating the starboard outboard motor in the raised position and the port outboard motor in the cruise position.

FIGS. 4 through 8 depict an alternate embodiment of the present invention. Specifically, as shown in FIG. 4, a boat generally indicated as 110 includes a hull generally indicated as 112 having a pair of longitudinally disposed tunnels 114 formed in the bottom 116 thereof and a substantially vertical motor well 118 formed in the aft portion thereof between midships 120 and the stern 122 to house a corresponding outboard motor generally indicated as 124 each including a propeller 126.

As best shown in FIG. 8, each longitudinally disposed tunnel 114 expands in the horizontal plane from a reduced origin 128 midship to an enlarged terminus 130 at the stern 122 to channel the flow of water to the propeller 126 of each outboard motor 124 as the boat 110 moves through the water. As depicted best in FIGS. 4 through 6, the upper surface 132 of the longitudinally disposed tunnel 114 slopes upwardly from the origin 128 aft to terminus 130 including a recess 133 to accommodate the corresponding propeller 126 when the corresponding outboard motor 124 is tilted FIG. 6 or when the corresponding outboard motor 124 is trimmed in shallow water FIG. 5.

Each substantially vertical motor well 118 is located forward of the stern 122 between the corresponding origin 128 and terminus 130 of the longitudinally disposed tunnel 114. The upper portion 134 of each substantially vertical motor well 118 is enlarged relative to the mid-portion thereof to allow the corresponding outboard motor 124 to rotate about a substantially vertical axis 136 a predetermined angular displacement such as thirty (30°) either side of the centerline 138 as shown in FIGS. 9 and 10 to steer the boat 110.

Each outboard motor 124 is mounted within the corresponding substantially vertical motor well 118 by a corresponding motor positioning assembly generally indicated as 140 comprising a vertical lift subassembly to adjust the vertical position of the corresponding outboard motor 124 and the propeller 126 between a lower or cruise position (FIG. 4), an intermediate trim position (FIG. 5) and an upper or fully retracted position (FIG. 6), and a corresponding rotational subassembly coupled to the vertical lift subassembly to rotate each outboard motor 124 on the corresponding substantially vertical rotation axis 136 to steer the boat 110.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A motor powered boat comprising a boat including a hull having a bottom, a bow and a stern including a starboard side and a port side with a starboard outboard motor and a port outboard motor each including an engine disposed within a corresponding motor compartment to enclose each said engine and an air flow system to direct air to each said engine during operation thereof and an idle exhaust system to direct exhaust gases generated by each said engine from each said motor compartment when each said engine is at idle wherein each said motor compartment is formed between a midship console disposed between said starboard outboard motor and said port outboard motor, a rear bulkhead, a hull side extension projecting rearwardly from said starboard side and said port side of said stern and a hatch disposed between an open position and a closed position extending between said hull side extensions.

2. The motor powered boat of claim 1 wherein said midship console comprises a hollow housing to provide buoyancy and lift to the boat and an access hatch moveably attached to said hollow housing to provide access to each propeller for maintenance while the boat is still in the water.

3. The motor powered boat of claim 1 wherein said air flow system comprises an air intake portion disposed in each said motor compartment to feed fresh air to an air intake of each said engine and said idle exhaust system comprises an exhaust gas portion disposed in each said motor compartment to discharge exhaust gases from an exhaust outlet of each said engine when each said engine is operating at idle.

4. The motor powered boat of claim 3 wherein said air intake portion comprises an air intake conduit coupled between an air inlet or air scoop attached to said boat and an air supply intake attached to each said engine to feed air from said air inlet or air scoop through said air intake conduit and said air supply intake into each said engine.

5. The motor powered boat of claim 4 wherein said exhaust gas portion comprises a gas outlet conduit coupled between an exhaust gas outlet coupler attached to an exhaust gas outlet formed in each said engine and an exhaust gas discharge housing or port attached to said boat to discharge exhaust gases from said exhaust gas outlet through said exhaust gas outlet coupler, said flexible gas outlet hose and said exhaust gas discharge housing or port when each said outboard motor is idling.

6. The motor powered boat of claim 5 wherein said air intake conduit and gas outlet conduit each comprises a flexible hose permitting said starboard outboard motor and said port outboard motor to be trimmed or tilted about a substantially horizontal axis an rotate about a substantially vertical axis.

7. The motor powered boat of claim 1 wherein said hatch is pivotally coupled to the stern of said boat movable between an open and closed position to permit access to starboard outboard motor and said port outboard motor when said hatch is in said open position.

8. The motor powered boat of claim 1 wherein said midship console includes an access hatch to permit access to the propellers of said starboard outboard motor and said port outboard motor.

9. A motor powered boat comprising a boat including a hull having a bottom, a bow and a stern including a starboard side and a port side with a starboard outboard motor and a port outboard motor each including an engine disposed within a corresponding motor compartment to enclose each said engine and a propeller and an air flow system to direct air to each said engine during operation thereof and an idle exhaust system to direct exhaust gases generated by each said engine from each said motor compartment when each said engine is at idle while permitting each said outboard motor to be trimmed or tilted about a substantially horizontal axis and rotated about a substantially vertical axis for directional control of the boat and a directional fluid flow control comprising an outer starboard flow channel found in said hull to direct water to said propeller of said starboard outboard motor and an outer port flow channel found in said hull to direct water to said propeller of said port outboard motor.

10. The motor powered boat of claim 9 wherein said outer starboard flow channel is formed by a substantially longitudinally disposed outer starboard directional control member extending downward from said bottom of said hull and a substantially longitudinally disposed center starboard directional control member including a centerline extending downward from said bottom of said hull and said inner starboard flow channel is formed by a substantially longitudinally disposed inner starboard directional control member including a centerline extending downward from said bottom of said hull and said substantially longitudinally disposed center starboard directional control member extending downward from said bottom of said hull and said outer port flow channel is formed by a substantially longitudinally disposed outer port directional control member extending downward from said bottom of said hull and a substantially longitudinally disposed port center directional control member extending downward from said bottom of said hull and said inner port flow channel is cooperatively formed by a substantially longitudinally disposed inner port directional control member extending downward from said bottom of said hull and said substantially longitudinally disposed port or center port directional control member extending downward from said bottom of said hull.

11. The motor powered boat comprising a boat of claim 10 wherein said centerlines of said substantially longitudinally disposed outer starboard directional control member and said substantially longitudinally disposed inner starboard directional control member are aligned on opposite sides of said starboard outboard motor and said centerlines of said substantially longitudinally disposed outer port directional control member and said substantially longitudinally disposed inner port directional control member are aligned on opposite sides of said port outboard motor.

12. The motor powered boat of claim 11 wherein said substantially longitudinally disposed center starboard directional control member is substantially aligned with the center of said starboard outboard motor and corresponding propeller and said substantially longitudinally disposed center port directional control member is substantially aligned with the center of said port outboard motor and corresponding propeller.

13. The motor powered boat of claim 12 wherein said substantially longitudinally disposed outer starboard directional control member is disposed adjacent said starboard side of said stern and said substantially longitudinally disposed outer port directional control member is disposed adjacent said port side of said stern.

14. The motor powered boat of claim 13 wherein said substantially longitudinally disposed center starboard directional control member and said substantially longitudinally disposed inner starboard directional control member each decrease in length from said stern to said bow relative to each other and relative to said substantially longitudinally disposed outer starboard directional control member and said substantially longitudinally disposed center port directional control member and said substantially longitudinally disposed inner port directional control member each decrease in length from the stern to the bow relative to each other and relative to said substantially longitudinally disposed outer port directional control member.

15. The motor powered boat of claim 14 further comprising a forward transition portion including a diagonally disposed substantially flat flow control surface extending upwardly from said bottom of said hull and a substantially horizontally disposed substantially flat flow control surface formed in a rear portion said bottom of said hull along the centerline extending from said diagonally disposed substantially flat flow control surface to said stern.

16. The motor powered boat of claim 15 wherein said bottom of said hull comprises a truncated V-shape at said rear portion thereof extending from said stern to substantially adjacent the origin of said diagonally disposed substantially flat flow control surface of said midship flow region cooperatively formed by said substantially horizontally disposed substantially flat flow surface and said bottom of said hull extending between said diagonally disposed substantially flat flow control surface of said midship flow region and a corresponding side of said hull.

17. A motor powered boat comprising a boat having a hull and stern and at least one outboard motor including an engine having an air intake and an exhaust gas outlet disposed within a motor compartment formed at said stern of said hull to at least partially enclose said engine and an air flow system including an air intake portion to supply air to said engine during operation thereof and an idle exhaust portion to feed exhaust gases generated by said engine from said motor compartment when said engine is at idle, said air intake portion comprising an air intake conduit coupled between an air inlet formed in said boat and an air supply intake attached to said engine to supply air through said air inlet, said air intake conduit and said air supply intake into said engine through the air intake and said exhaust gas portion comprises a flexible gas outlet conduit coupled between an exhaust gas outlet coupler attached to the exhaust gas outlet of said engine and an exhaust gas discharge port formed in said boat to discharge exhaust gases from the exhaust gas outlet through said exhaust gas outlet coupler, said flexible gas outlet conduit and said exhaust gas discharge port when said engine is idling.

* * * * *